April 22, 1952 W. J. BOWAN ET AL 2,593,968
LUBRICATED VALVE
Filed Dec. 26, 1945 2 SHEETS—SHEET 1

Walter J. Bowan,
Frederick Tratzik,
INVENTORS.

BY
Cushman, Darby & Cushman
ATTORNEYS.

April 22, 1952
W. J. BOWAN ET AL
2,593,968
LUBRICATED VALVE
Filed Dec. 26, 1945
2 SHEETS—SHEET 2
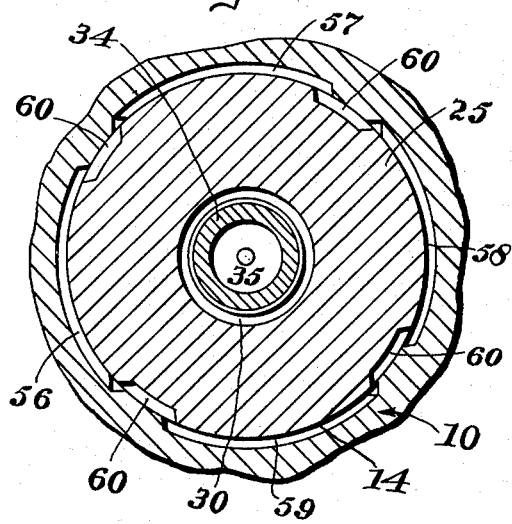
Fig. 2.
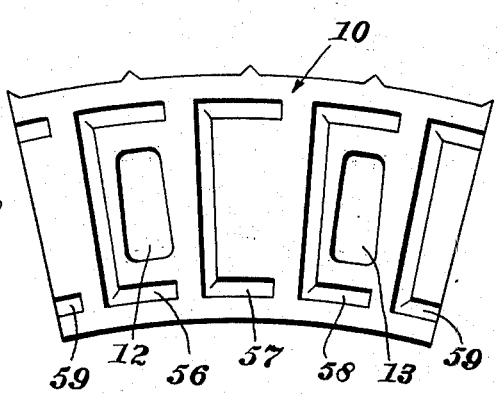
Fig. 3.
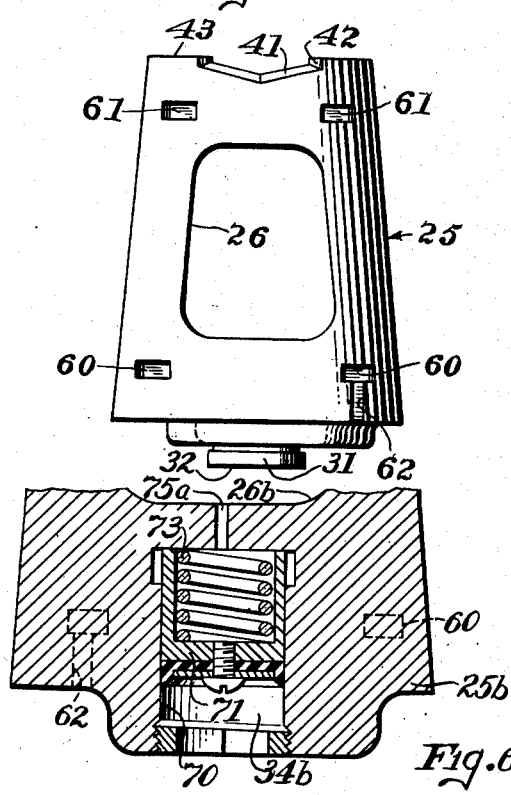
Fig. 4.
Fig. 6.
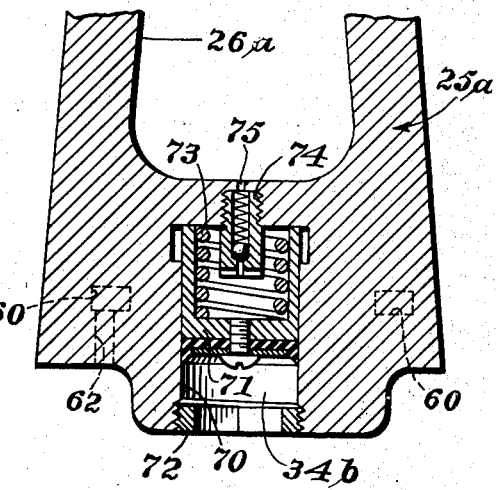
Fig. 5.
Walter J. Bowan, &
Frederick Tratzik,
INVENTORS.
BY
Cushman, Darby & Cushman
ATTORNEYS.

Patented Apr. 22, 1952

2,593,968

UNITED STATES PATENT OFFICE 2,593,968

LUBRICATED VALVE

Walter J. Bowan and Frederick Tratzik, Decatur, Ill., assignors to Mueller Co., Decatur, Ill., a corporation of Illinois Application December 26, 1945, Serial No. 637,222

6 Claims. (Cl. 251—93)

The present invention relates to lubricated valves.

Objects of the invention are to provide a valve which includes an arrangement to automatically move lubricant to the seating surfaces, will provide an extremely efficient seal in a flow line under pressure, and which may be readily operated even when used with extremely high line pressures.

Other objects and advantages of the invention will be apparent from the following specification and accompanying drawings wherein:

Figure 2 is a transverse section on the line 2—2 of Figure 1,

Figure 3 is a developed view of the valve casing member seating surface,

Figure 4 is an elevation of the valve plug,

Figure 5 is an axial section of a valve plug of Figure 1, but showing only the central portion of this structure, viz., the plug and operating member provided with a modified form of lubricant reservoir.

Figure 6 is a view similar to Figure 5 showing another modified form of lubricant reservoir.

Figure 1:
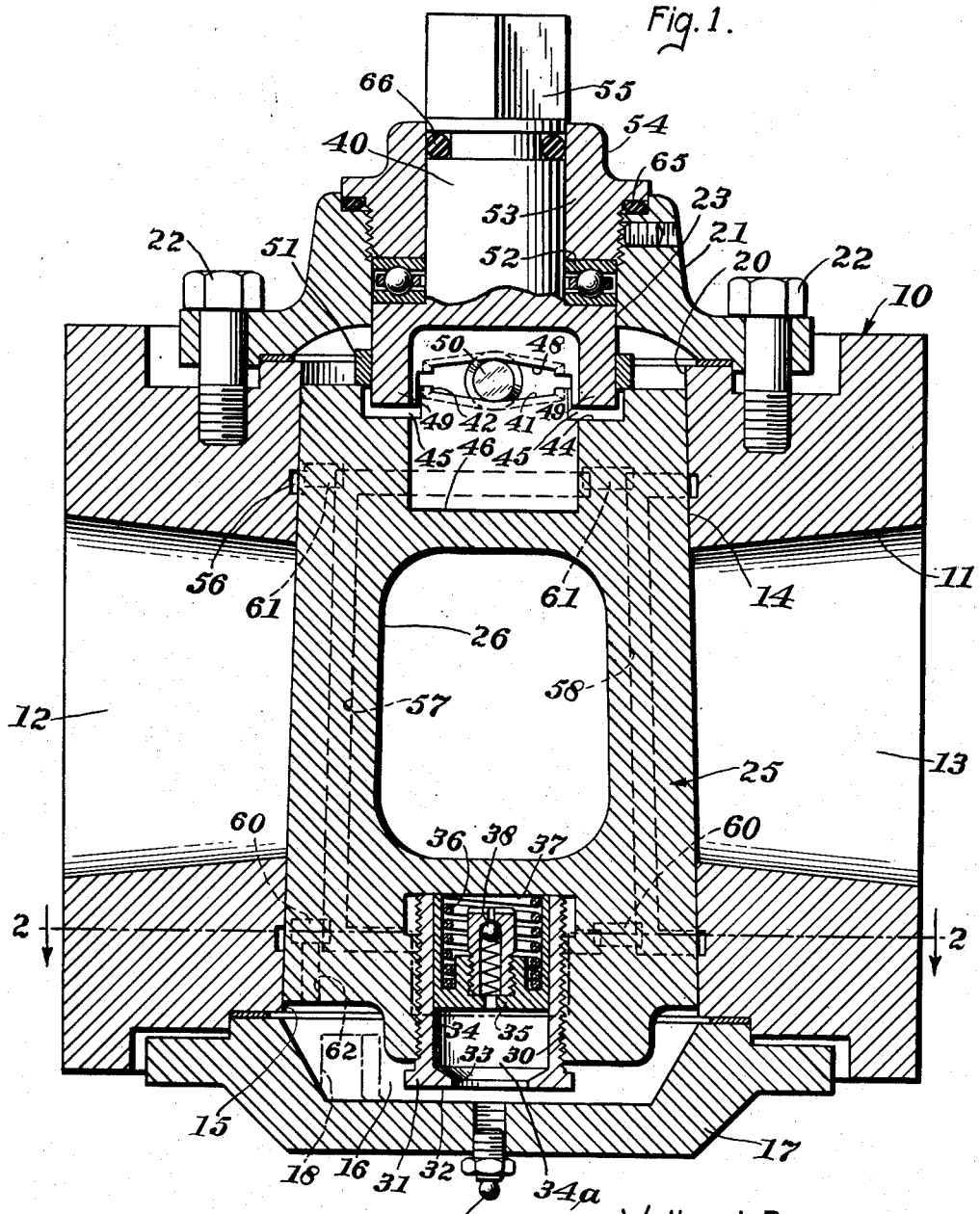
Figure 1 is an axial section through a valve of the present invention.

Referring to Figure 1, the numeral 10 designates the valve casing member which is provided with a flow passageway 11 including an inlet 12 and an outlet 13. A tapered valve seat bore 14 extends transversely of the flow passageway 11, the larger end 15 of the seat bore opening to a chamber 16 which is closed at its outer end by a plate or cap 17 secured in position by means of bolts, not shown. A gasket may be provided between the plate 17 and casing member. As is indicated in dotted lines in Figure 1, a stop block 18 extends upwardly from the plate 17 to limit rotation of the valve plug or element in a manner hereinafter described.

The smaller end 20 of the seat bore 14 also extends through the casing member 10 but is closed by a bossed plate 21 secured to the casing by circumferentially spaced bolts 22 such as shown in Figure 1. Plate 21 includes a bore 23 of a smaller diameter than the smaller end 20 of the seat bore 14.

A tapered plug 25 is mounted in the seat bore 14, the plug including a flow port 26. The larger end of the plug 25 extends into the chamber 16 at the larger end of the casing member 10 and this end of the plug includes a central threaded socket 30. A sleeve 31 is threaded in the socket 30, the sleeve including an outer end wall 32 provided with a central aperture 33 which is of less diameter than the inner wall 34 of the sleeve. The sleeve 31 thus defines a second chamber 34a which communicates with the first-mentioned chamber 16. In addition, the sleeve 31 serves as a cylinder for a piston or impulse element 35. Piston 35 is urged toward the outer end of its cylinder 31 by a coil spring 36 positioned to bear upon the rearward side of the piston, the opposite end of the spring bearing upon the inner end 37 of the recess 30.

As is hereinafter explained, the chambers 16 and 34a are adapted to be filled with lubricant. In order to permit air pressure to escape from behind the piston during assembly of the device, a spring-fitted check valve 38 is positioned in the piston 35, this check valve being designed to permit air to escape from behind the piston but to prevent lubricant from moving to the rear side of the piston.

The smaller end of the plug 25 is so formed as to co-operate with a similar structure provided on the inner end of an operating stem 40. This arrangement, which causes the plug or valve element to initially move axially when any rotating force is applied thereto, is described in detail in our application for Valves, Serial No. 611,465, filed August 20, 1945, which matured to Patent No. 2,510,494 on June 6, 1950. For the purpose of the present invention, this operating arrangement may be described as follows: The smaller end 20 of the plug includes a pair of diametrically opposite and concentric concave cam surfaces 41 each of which is of V-shaped form. As best shown in Figure 4, the cam surfaces 41 are inclined at an acute angle to a radius of the plug, with their point of greatest depth at the seating surface of the plug.

The cam surfaces 41 extend through an arc of somewhat less than 60° as best shown in Figures 1 and 4 and, at their ends, have shoulders 42 extending upwardly to the flat end surface of the plug so that flats 43 are provided adjacent both ends of each cam surface. Between the flats 43, and midway between the cam surfaces 41, the plug is provided with recesses or pockets 44. The diametrically opposite cam surfaces 41 and the diametrically opposite recesses 44 are arranged about a circular line concentric with the plug axis.

The radially inner edges of the cams 41 may be defined by a central socket 46 in the plug. The shoulders 42 and the end walls 45 of the recesses 44 lie in planes which lie on the axis of the plug.

The operating stem or element 40 is equipped with two concave, arcuate and V-shaped cam surfaces 48 which will normally lie directly opposite the respective plug cam surface 41. As shown in Figure 1, two diametrically opposite projections 49 are on the stem 40, these projections and an adjacent cam surface 48 being spaced 90° so that a projection 49 will extend into each recess 44 of the plug. Each projection 49 includes a shoulder at each end thereof and these shoulders lie in planes which lie on the axis of the stem. As is explained in said earlier application, the projections 49 are of a length circumferentially of the plug which is less than the corresponding dimension of the recesses 44. In this way, the projections 49 have a loose fit with respect to the recesses circumferentially of the plug and operating element 40. A roller 50 is positioned between each pair of axially opposed cam surfaces 41 and 48, the rollers being of tapered formation to conform to the surfaces of the cams and rounded at their outer ends so that they will have a single point bearing upon the inner cylindrical surface of a holding ring 51 which fits about the inner end of the operating stem or element 40. The rollers 50 are held in proper position radially of the cam surfaces by the ring 51 and, because the rollers are tapered, no other securing means is required to maintain them in position.

As shown in Figure 1, the operating stem 40 is of reduced diameter at its outer end to provide an outwardly facing shoulder thereon within the bore 23 of bossed plate 21 and a roller bearing assembly 52 is positioned between this shoulder and a retainer sleeve 53. Retainer sleeve 53 is threaded in the bore 23 of the plate 21 and, at its outer end, it is provided with flat surfaces indicated at 54 adapted to be engaged by a suitable wrench. Stem 40 extends outwardly beyond the sleeve 53 and may be squared as indicated at 55 to receive an operating handle or wrench. Sleeve 53 serves to hold stem 40 against outward movement.

As best shown in Figure 3, the seating surface 14 of the valve body element 10 is provided with four C-shaped grooves 56, 57, 58 and 59, respectively. The longitudinally extending portions of these grooves are spaced ninety degrees apart about the seating surface but the free ends of the circumferentially extending portions of each C-shaped groove are spaced from the longitudinal portion of the next adjacent C-shaped groove. It will be observed from Figure 3 that the grooves 56 and 58 enclose the inlet passage 12 and outlet passage 13, respectively and that each passage is equidistantly spaced between the longitudinal portion of two grooves.

As best shown in Figures 1 and 4, the valve plug 25 has four arcuate grooves 60 equidistantly spaced about its large end at a point between the large end of the plug and the adjacent end of the flow port 26. These grooves are only of sufficient length circumferentially of the plug that they will bridge the corresponding ends of the C-shaped grooves when the plug is in either open or closed position. The small end of the plug 25 has short arcuate grooves 61 equidistantly spaced thereabout at a point between the small end of the plug and the adjacent end of the flow port 26. Two diametrically opposed short grooves 60 have ducts 62 extending therefrom to the large end of the plug 25 so that the ducts 62 open to chamber 16. It will be observed that each short groove 60 lies in the same radial plane as a corresponding short groove 61.

When the plug is in the closed position illustrated in Figure 1, the short grooves will bridge adjacent C-shaped grooves with the result that the flow passageways 12 and 13 will each be completely surrounded by an unbroken line of lubricant, and an unbroken line of lubricant will surround each end of the seating surfaces. This will prevent leakage circumferentially about the plug as well as past either end of the plug. During rotation of the plug from closed position to open position, or vice-versa, the plug flow port 26 obviously will expose the longitudinally extending portion of two of the C-shaped grooves to the flow passageways 12 and 13. However, because of the fact that the short grooves 60 which will then be opened to these two C-shaped grooves are blind, i. e., are not connected to the grease supply reservoir 16 by ducts 62, the grease in the two opposed C-shaped grooves will not be subject to pressure from the grease reservoir or chambers.

Figure 1 shows the C-shaped grooves and the short connecting grooves slightly circumferentially offset from their true positions in order to prevent confusion of the various lines. In addition, it will be understood that the various grooves of the plug are of sufficient width that they will remain in communication with the corresponding opposed grooves of the casing member even when the plug is unseated as hereinafter described.

In order to prevent leakage between the retainer sleeve 53 and the bossed plate 21, a packing ring 65 of the character described in our above-mentioned application, Serial No. 611,465, is provided between these two surfaces. Leakage along the stem 35 is prevented by a packing ring 66 corresponding to that described in said earlier application. As is described in said earlier application, the ring 65 is of such character that the retainer sleeve 53 may be slightly backed out to permit some play between the cams 48 and the rollers 50 and so that the valve plug may be fully seated, all without permitting leakage past packing 65.

In the use of the structure shown in Figures 1 to 4, lubricant will be forced under pressure to the chamber 16 through a lubricant fitting 67 provided in the plate 17. The entering lubricant will move upwardly from chamber 16 through the short longitudinal grooves or ducts 62 and, if the plug is in either opened or closed position, the entire groove system will be filled with grease. That is, with the plug in opened or closed position, the short grooves 60 and 61 will bridge the C-shaped grooves so that the lubricant can fill the entire system of grooves. Lubricant will also move through aperture 33 into chamber 34a so as to place the spring 36 under compression.

In the operation of the structure of Figures 1 to 4, if the valve element 25 is in either fully opened or fully closed position, the application of turning force to the operating stem 55 will have the action described in our said earlier application, Serial No. 611,465; that is, if the valve element 25 is too tightly seated, the rollers 50 will move along the cam surface 41 of the valve element to move the latter axially. Because the chambers 16 and 34a are completely filled with lubricant upon which piston 35 and spring 36 bear, the axial movement of plug 25 will create a tremendous pressure in the chambers 16 and 34a. Although this pressure is reduced as soon as plug 25 is slightly unseated, nevertheless, while the plug 25 is moving axially and further into chamber 16, and before it is actually unseated, the lubricant in that chamber is being compressed from two different directions or sources, namely, by the end of plug 25 and by the spring-pressed piston 35. Because of these pressures, the lubricant will be forced through the two ducts 62 and into the lubricant passageways. Obviously, when the plug is then rotated by the engagement of the operating stem projections 49 with the end walls 45 of the valve element recesses 44, the lubricant will be thoroughly distributed over the seating surfaces of the valve. In other words, when the valve element 25 is either opened or closed by means of the operating structure, automatic lubrication occurs.

After completion of the above lubricating action, the spring 36 will urge the piston 35 outwardly to displace from the chamber 34a an amount of lubricant corresponding to that expelled from chamber 16 during the lubricating action just described. The spring 36 will repeat this action until the displacement of lubricant from chamber 34a is beyond its range of expansion. Additional lubricant can then be supplied to the valve through the fitting 67.

The spring 36 behind piston 35 must be of sufficient strength to force piston 35 outwardly against the pressure of the lubricant in the chamber 16 and also to resist rearward movement of the piston when axial movement of the valve element 25 increases the pressure in the chamber 16. Because the smaller chamber 34a is in communication with the larger chamber 16, the load exerted will be equal in unit area pressure in both the small chamber and the large chamber. However, the area at the larger end of the plug 25 is substantially larger than the area of the piston 35. Therefore, the total load against the larger end of plug 25 is substantially greater than that on piston 35 and with compression spring 36 exerting a constant load against the lubricant in the small chamber 34a, the plug will be kept tightly seated.

The form of invention illustrated in Figure 5 differs from that of Figures 1 to 4 only with regard to the small lubricant chamber 34b. Referring to Figure 5, the plug 25a illustrated therein includes a small chamber 70 at its larger end, with a piston 71 provided with a face packing mounted in the chamber. A collar 72 is threaded in the outer end of the bore to limit outward movement of the piston under the action of the spring 73 positioned behind the piston. A check valve 74 is positioned in a passageway 75 which opens to the flow port 26a of the plug, the check valve being spring-pressed to permit escape of air to the flow port 26a during assembly but to prevent reverse flow. The operation of the Figure 5 structure is otherwise identical with that of Figures 1 to 4.

As is indicated in Figure 6 with respect to a plug 25b, in some installations, the check valve 74 of Figure 5 may be omitted so that line pressure will act upon the piston 71 through a port 75a opening from the plug flow port 26b. Thus, line pressure will assist spring 73 in applying and maintaining pressure upon the lubricant.

The terminology used in the specification is for the purpose of description and not of limitation, the scope of the invention being defined in the claims.

I claim:

1. In a valve, a casing member provided with a flow passageway and a seat bore, a ported valve element mounted in the seat bore, a lubricant chamber communicating with the seat bore, a surface of the valve element forming a wall portion of the chamber, means to move the valve element with respect to a fixed portion of the chamber to increase the pressure on the lubricant in the chamber, a piston in the chamber, and a spring behind said piston and of sufficient strength to resist rearward movement of the piston when the valve element increases pressure on the lubricant.

2. In a valve, a casing member provided with a flow passageway and a seat bore, a ported valve element mounted in the seat bore, a lubricant chamber communicating with the seat bore, a radial surface of the valve element forming a wall portion of the chamber, means to move the valve element axially of the seat bore and with respect to a fixed portion of the chamber to increase the pressure on the lubricant in the chamber, a piston in the chamber, and a spring behind said piston and of sufficient strength to resist rearward movement of the piston when the valve element increases pressure on the lubricant.

3. In a valve, a casing member provided with a flow passageway and a seat bore, a lubricant chamber in the casing member into which an end of the valve member extends, means to move the valve element into the chamber to force lubricant from the latter to the valve seating surfaces, a second lubricant chamber in said end of the valve member and communicating with said first chamber, and means in the second chamber to maintain lubricant under pressure.

4. In a valve, a casing member provided with a flow passageway and a tapered seating surface, a tapered plug having a seating surface mounted in the casing member seating surface, a lubricant passageway open to one of the seating surfaces, a lubricant chamber at the larger end of the casing member seating surface and into which the larger end of the plug extends, the lubricant passage communicating with the chamber, means cooperating with the smaller end of the plug to move the latter axially of the casing member seating surface and further into the lubricant chamber prior to rotational movement to thereby force lubricant from the chamber and to the lubricant passage, a second lubricant chamber in the larger end of the plug and opening to the first lubricant chamber, and means in the second chamber to force lubricant from the latter and to the first chamber.

5. In a valve, a casing member provided with a flow passageway and a tapered seating surface, a tapered plug having a seating surface mounted in the casing member seating surface, a lubricant passageway open to one of the seating surfaces, a lubricant chamber at the larger end of the casing member seating surface and into which the larger end of the plug extends, the lubricant passage communicating with the chamber, means cooperating with the smaller end of the plug to move the latter axially of the casing member seating surface and further into the lubricant chamber prior to rotational movement to thereby force lubricant from the chamber and to the lubricant passage, a second lubricant chamber in the larger end of the plug and opening to the first lubricant chamber, said second chamber being open to the plug port so that line pressure may flow to the second chamber to force lubricant from the latter and to the first chamber.

6. In a valve, a casing member provided with a flow passageway and a seat bore, a ported valve element mounted in the seat bore, a lubricant chamber communicating with the seat bore, a surface of the valve element forming a wall portion of the chamber, means to move the valve element with respect to a fixed portion of the chamber to increase the pressure on the lubricant in the chamber, the chamber being open to line pressure so that the lubricant therein will be maintained under pressure.

WALTER J. BOWAN.
FREDERICK TRATZIK.

REFERENCES CITED

The following references are of record in the file of this patent:

UNITED STATES PATENTS

| Number | Name | Date |
| --- | --- | --- |
| 1,400,647 | Westinghouse | Dec. 20, 1921 |
| 1,937,122 | Leach | Nov. 28, 1933 |
| 2,065,726 | Nordstrom | Dec. 29, 1936 |
| 2,070,490 | Nordstrom | Feb. 9, 1937 |
| 2,086,946 | Rick | July 13, 1937 |
| 2,169,525 | Goldberg | Aug. 15, 1939 |
| 2,222,626 | Mueller | Nov. 26, 1940 |

FOREIGN PATENTS

| Number | Country | Date |
| --- | --- | --- |
| 256,098 | Great Britain | Aug. 5, 1926 |
| 484,239 | Great Britain | May 3, 1938 |